J. A. BROWN.
POTATO DIGGING MACHINE.
APPLICATION FILED MAR. 14, 1918.
1,298,169.
Patented Mar. 25, 1919.
3 SHEETS—SHEET 1.
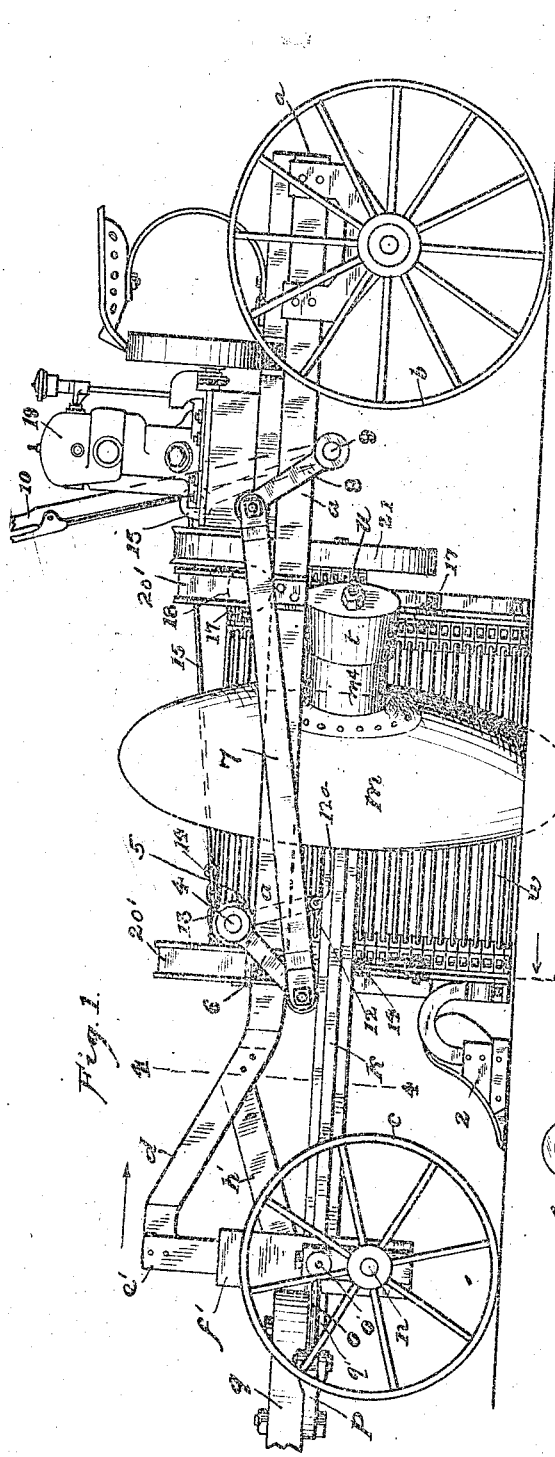
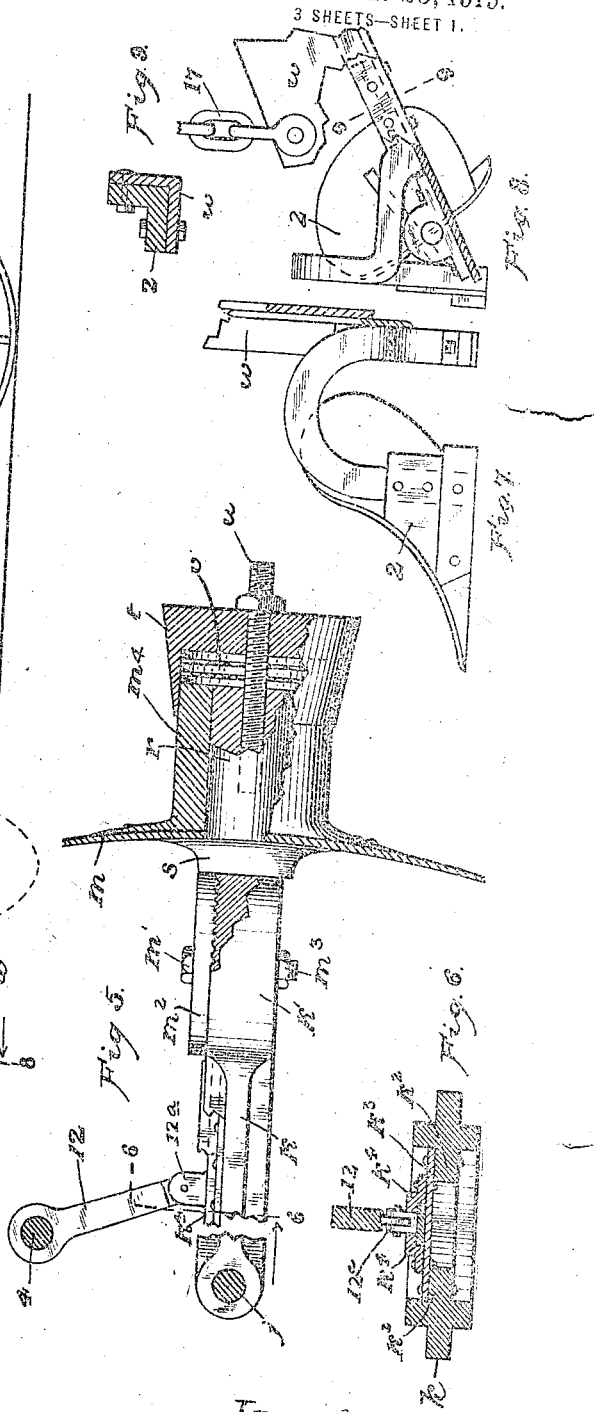
Inventor:
John A. Brown
by T. J. Geisler
atty.

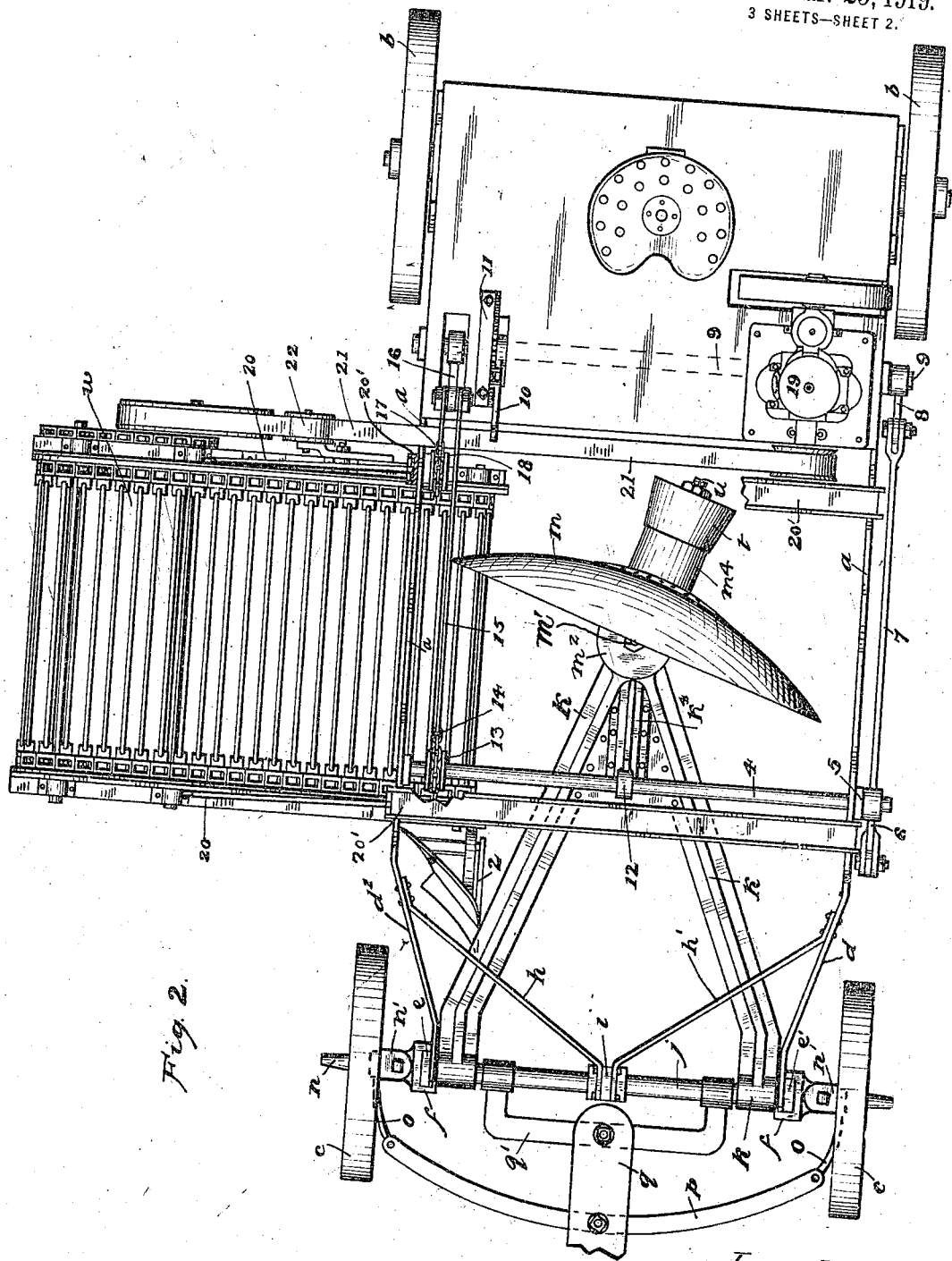

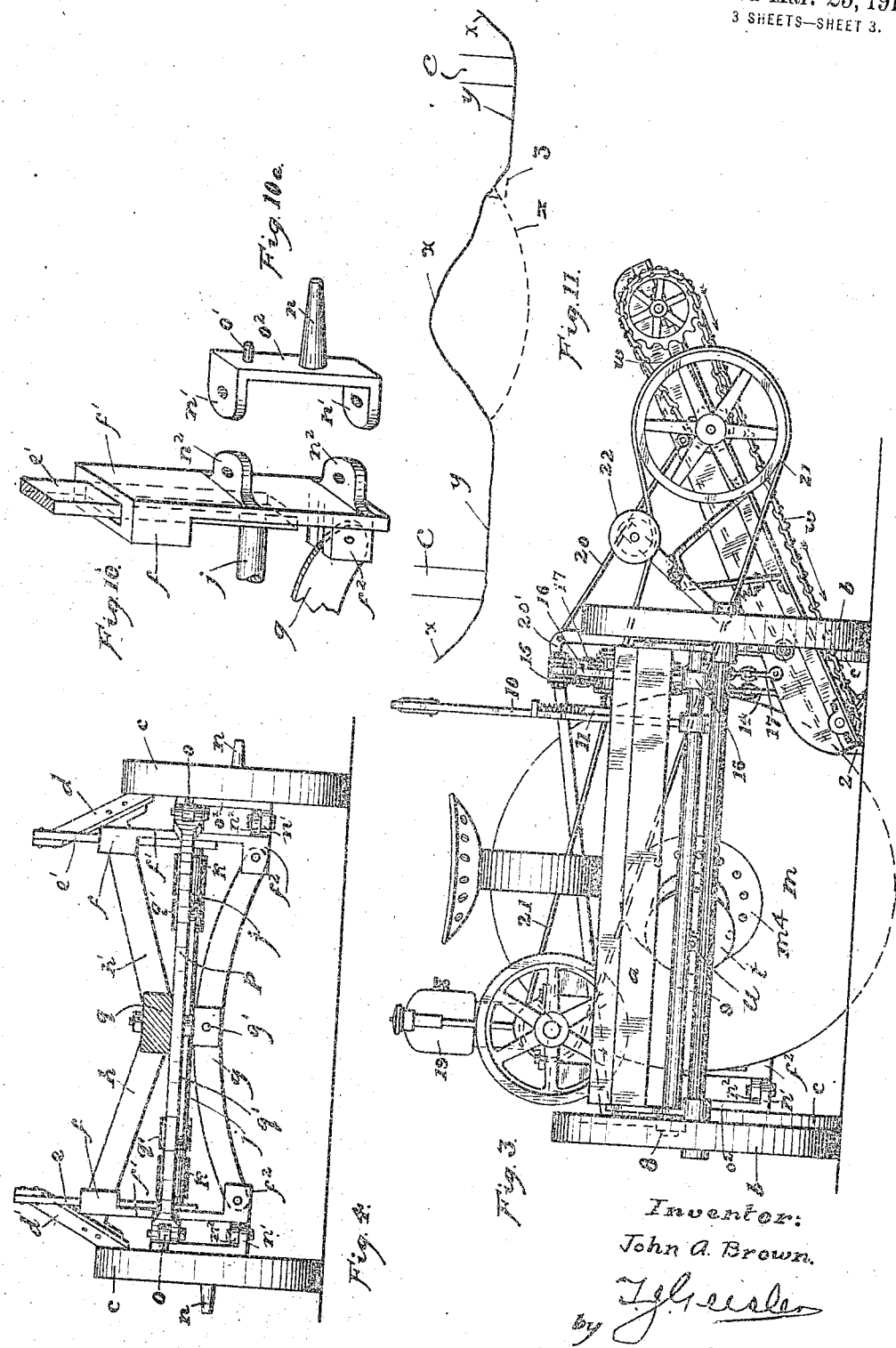

UNITED STATES PATENT OFFICE.

JOHN A. BROWN, OF CAMAS, WASHINGTON, ASSIGNOR OF ONE-HALF TO HUGH E. BROWN, OF PORTLAND, OREGON.

POTATO-DIGGING MACHINE.

1,298,169.

Specification of Letters Patent.

Patented Mar. 25, 1919.

Application filed March 14, 1918. Serial No. 222,499.

*To all whom it may concern:*

Be it known that I, JOHN A. BROWN, a citizen of the United States, and a resident of Camas, Clarke county, State of Washington, have invented a certain new and useful Improvement in Potato-Digging Machines, of which the following is a specification.

My invention has for its object the providing of a potato digging machine which comprises a disk adapted to rotate in the ground during the forward travel of the machine, and operating to dig up the potato hills, an elevator on which the potato vines, roots, and adhering clods of dirt are thrown by the disk, and a plow coöperating with the disk for clearing a path along which the elevator may move in the travel of the machine.

I attain my object by my machine illustrated in the accompanying drawings; and in addition to the features mentioned, my machine includes means for adjusting the disk with respect to the ground line, so as to regulate the depth of cut, and for adjusting the same at a variable angle with respect to the line of motion of the machine; and also means for driving the elevator by power, so that the same may be kept going while the machine is standing still, as is desirable in order to break up and dispose of the clods of earth thrown upon the elevator.

The construction and operation of my machine is hereinafter described, having reference to said drawings, in which:

Figure 1 is a side elevation of my machine;

Fig. 2 is a plan or top view thereof;

Fig. 3 is a rear-end elevation;

Fig. 4 is a front elevation of the front end of the vehicle body, not looking back of line 4—4 of Fig. 1;

Fig. 5 is a detail of the pivoted disk-carrying arms;

Fig. 6 is a section on the line 6—6 of Fig. 5;

Fig. 7 is an enlarged fragmental section of the plow carried by the bottom end of the elevator of my machine; the details shown in this figure agreeing in position with the corresponding parts in Fig. 1;

Fig. 8 is a fragmental elevation on the line 8—8 of Fig. 1;

Fig. 9 is a section on line 9—9 of Fig. 8;

Figs. 10 and 10ª are details, shown in perspective of the means for journaling the front wheels on the vehicle body adapted to allow either front wheel to adapt itself to inequalities in the road surface; and Fig. 11 is a diagram illustrating the contour of a section of land planted to potatoes, and over which my machine is running, and illustrates how the wheels (c) straddle the potato hills, and how the disk, carried by my machine, digs up the hill, also shows the location of the plow carried by the elevator of my machine and coöperating with the disk for cutting a path in which the bottom end of the elevator travels.

$a$ is a vehicle body mounted on hind wheels $b$ and front wheels $c$. The front wheel support comprises a neck made of two members $d$, $d'$, as shown in Figs. 1 and 2. To the free ends of the latter frame members are rigidly fastened pendent frame members $e$, $e'$, which bear in the sockets $f$ of the vehicle body frame members $f'$, see Figs. 1, 4 and 10. The lower ends of the frame members $f'$ are connected by a curved bar $g$ pivoting at $g'$, and having its ends pivotally connected with the lugs $f^2$ of the frame members $f'$. The frame members $h$, $h'$ serve as braces for connecting the frame members $d$, $d'$, with a knuckle $i$, (shown only in Fig. 2) through which extends a rigid shaft $j$, the ends of which are fastened to the lower ends of frame members $e$, $e'$. The disk supporting arms $k$ are pivotally mounted on the shaft $j$. The front wheels are adapted to accommodate themselves to the inequalities of the road surface by the box $f$ of the frame members $f'$ sliding over the pendent frame members $e$, $e'$. The front wheels $c$ are journaled on stub axles $n$ rigidly fastened to the piece $o^2$ which is pivotally connected by knuckles $n'$ with the knuckles $n^2$ of the vehicle frame members $f'$, and said axles are steered by having the steering arms $o$ pivotally connected by a bar $p$ with the tongue $q$. Therefore whichever way the latter is guided the front wheels will follow. The steering arms $o$ are rigidly fastened to the pins $o'$ carried by the piece $o^2$. The end of the tongue $q$ is pivotally fastened to the bars $q'$ the ends of which are mounted on bar $j$. The disk $m$ is rotatably supported on the free end of its carrying arms $k$ by means permitting the rotation of the disk about an axis $m'$ so as to adjust the disk at variable angles relatively to the line of motion of my machine. I find it convenient to make the free end $k'$ of the arm $k$ with a knuckle having a serrated upper face on which is mounted a plate $m^2$ having a corresponding face by means of a bolt-and-nut element $m^3$. The plate $m^2$ has a stub shaft $r$ provided with a flange $s$, the stub shaft being inserted through a hole at the center of the disk $m$, while its flange bears against the inner face of the disk. The flange $s$ has a face adapted to bear against the knuckle $k'$ of the disk-carrying arm $k$. The disk $m$ is provided with a rigid hub $m^4$ which bears on the stub shaft $r$. A cap $t$ encompasses the hub $m^4$. The parts are united by a screw bolt $u$, and a friction bearing element $v$ is interposed between the bearing faces, so that the disk $m$ may have free rotation.

The disk $m$ is dished and its function is to dig out the potatoes and throw them together with vines, roots and adhering clods of dirt on an elevator $w$.

In the operation of my machine, the wheels would run in the valleys $y$ see Fig. 11 between the hills $x$ and the disk of my machine will dig up the hills as represented by the line $z$. The elevator $w$ is provided with a plow 2 located and adapted to cooperate with the disk $m$, that is to say, cutting a furrow 3, as diagrammatically illustrated in Fig. 11, adjacent the path cut by the disk, in order to provide a path for the bottom end of the elevator to move in.

A transverse rock shaft 4 is supported by brackets 5 on the vehicle frame. The rock shaft is provided with a rigid arm 6 connected with a rod 7, the opposite end of which connects with an arm 8 on the rock shaft 9, on which is a rigid lever 10 having a pawl bearing on a ratchet segment 11, so that the lever 10 may be secured in any position to which it is adjusted. The rock shaft 4 also is provided with a rigid arm 12 the free end of which is connected with the disk-carrying arm $k$, as shown in Figs. 1, 5 and 6. The connection of the arm 12 with the disk carrying arm $k$ is arranged as shown in Fig. 6.

The side members $k^2$ of the arm $k$ support a plate $k^3$ to which are rigidly fastened the slotted bearings $k^4$ in which slides a shoe $12^a$ with which the arm 12 is pivotally connected. Thus by the operation of the lever 10 the disk-carrying arm $k$ may be raised and lowered so as to relatively adjust the disk $m$ to the ground line and also rigidly hold the same in position as adjusted.

In unison with the raising and lowering of the disk $m$, the elevator is also relatively raised and lowered in order that the bottom end of the elevator may be positioned in correspondence with the depth of cut made by the disk. The means for so raising and lowering the elevator comprise a flanged guide pulley 13 rotatably mounted on the rock shaft 4, see Fig. 2. Over the guide pulley runs a chain 14, the upper end of which is connected to a rod 15 connected to an arm 16 rigid on the rock shaft 9, and the lower end of the chain 14 is fastened to one side of the bottom of the elevator $w$. In order to lift both sides of the elevator, I provide as auxiliary lifting means for the latter a short chain 17 running over a flanged guide pulley 18, mounted on the frame the lower end of such chain being attached to the other side of the elevator and the upper end of said chain being also fastened to the arm 16.

I prefer to have the elevator of my machine run by a motor 19 so that the elevator may be kept running independently of the travel of my machine, which is desirable to break up the clods of dirt thrown on the elevator, and the same arrangement relieves the power required for pulling my machine over the field.

The elevator $w$ may be of any convenient construction. It is pivotally supported at its upper end by the rods 20, which are held by the supports 20'. The elevator is driven by a belt 21 on which bears a belt tightener 22.

The details of construction shown but not described may be arranged as convenient.

The operation of my machine is self evident from the preceding description of the construction thereof.

I claim:

1. A digging machine comprising a vehicle body, a rotatably mounted dished disk carried by the vehicle body, an elevator, and a plow arranged to cut a furrow adjacent the path cut by the disk thereby to provide a path for the bottom end of the elevator to move in.

2. A digging machine comprising a vehicle body, a rotatably mounted dished disk carried by the vehicle body, such disk being relatively adjustable with respect to the ground line and also with respect to the line of motion of the machine, an elevator, and a plow arranged to cut a furrow adjacent the path cut by the disk thereby to provide a path for the bottom end of the elevator to move in.

3. A digging machine comprising a vehicle body, a rotatably mounted dished disk carried by the vehicle body, such disk being adjustable with respect to the ground line and also with respect to the line of motion of the machine, an elevator, a plow arranged to cut a furrow adjacent the path cut by the disk thereby to provide a path for the bottom end of the elevator to move in, and means for holding and adjusting the disk relatively to the ground line.

4. A digging machine comprising a vehicle body, a rotatably mounted dished disk carried by the vehicle body, such disk being adjustable with respect to the ground line and also with respect to the line of motion of the machine, an elevator, a plow arranged to cut a furrow adjacent the path cut by the disk thereby to provide a path for the bottom end of the elevator to move in, means for holding and adjusting the disk relatively to the ground line, and means for raising and lowering the elevator in unison with said adjustment of the disk.

5. A digging machine comprising a vehicle body, a rotatably mounted dished disk carried by the vehicle body, such disk being adjustable with respect to the ground line and also with respect to the line of motion of the machine, an elevator, a plow carried by the elevator arranged to cut a furrow adjacent the path cut by the disk thereby to provide a path for the bottom end of the elevator to move in, means for holding and adjusting the disk relatively to the ground line, and means for raising and lowering the elevator in unison with said adjustment of the disk.

6. A digging machine comprising a vehicle body, a rotatably mounted dished disk carried by the vehicle body, such disk being adjustable with respect to the ground line and also with respect to the line of motion of the machine, an elevator, motor driving means for driving the latter, a plow carried by the elevator arranged to cut a furrow adjacent the path cut by the disk thereby to provide a path for the bottom end of the elevator to move in, means for holding and adjusting the disk relatively to the ground line, and means for raising and lowering the elevator in unison with said adjustment of the disk.

7. A digging machine comprising a vehicle body, a rotatably mounted dished disk carried by the vehicle body, such disk being adjustable with respect to the ground line and also with respect to the line of motion of the machine, an elevator, a plow arranged to cut a furrow adjacent the path cut by the disk thereby to provide a path for the bottom end of the elevator to move in, and means for raising and lowering the elevator in unison with said adjustment of the disk.

JOHN A. BROWN.